United States Patent
Haj Aboutalebi et al.

(10) Patent No.: US 11,899,589 B2
(45) Date of Patent: Feb. 13, 2024

(54) SYSTEMS, METHODS, AND DEVICES FOR BIAS MODE MANAGEMENT IN MEMORY SYSTEMS

(71) Applicant: Samsung Electronics Co., Ltd., Suwon-si (KR)

(72) Inventors: Armin Haj Aboutalebi, San Jose, CA (US); Rekha Pitchumani, Oak Hill, VA (US); Zongwang Li, Dublin, CA (US); Marie Mai Nguyen, Pittsburgh, PA (US)

(73) Assignee: SAMSUNG ELECTRONICS CO., LTD.

( * ) Notice: Subject to any disclaimer, the term of this patent is extended or adjusted under 35 U.S.C. 154(b) by 27 days.

(21) Appl. No.: 17/500,927

(22) Filed: Oct. 13, 2021

(65) Prior Publication Data

US 2022/0405207 A1 Dec. 22, 2022

Related U.S. Application Data

(60) Provisional application No. 63/213,691, filed on Jun. 22, 2021.

(51) Int. Cl.
  *G06F 12/0882* (2016.01)
  *G06F 12/02* (2006.01)
  (Continued)

(52) U.S. Cl.
  CPC ...... *G06F 12/0882* (2013.01); *G06F 12/0238* (2013.01); *G06F 13/1621* (2013.01);
  (Continued)

(58) Field of Classification Search
  CPC ........... G06F 12/0831; G06F 2212/621; G06F 12/0815; G06F 2212/302; G06F 12/0837;
  (Continued)

(56) References Cited

U.S. PATENT DOCUMENTS

| 7,916,543 B2 | 3/2011 | Goda et al. |
| 8,271,729 B2 | 9/2012 | Li et al. |

(Continued)

FOREIGN PATENT DOCUMENTS

| KR | 100230267 B1 | 11/1999 |
| KR | 102210961 B1 | 2/2021 |

OTHER PUBLICATIONS

European Extended Search Report for Application No. 22179209.6, dated Nov. 17, 2022.

*Primary Examiner* — Charles Rones
*Assistant Examiner* — Hewy H Li
(74) *Attorney, Agent, or Firm* — Renaissance IP Law Group LLP

(57) ABSTRACT

A method for managing a memory system may include monitoring one or more accesses of a page of memory, determining, based on the monitoring, an access pattern of the page of memory, and selecting, based on the access pattern, a coherency bias for the page of memory. The monitoring may include maintaining an indication of the one or more accesses. The determining may include comparing the indication to a threshold. Maintaining the indication may include changing the indication in a first manner based on an access of the page of memory by a first apparatus. Maintaining the indication may include changing the indication in a second manner based on an access of the page of memory by a second apparatus. The first manner may counteract the second manner.

20 Claims, 13 Drawing Sheets

(51) Int. Cl.
  *G06F 13/16* (2006.01)
  *G06N 20/00* (2019.01)
  *G06F 18/214* (2023.01)

(52) U.S. Cl.
  CPC ........ *G06F 13/1668* (2013.01); *G06F 18/214* (2023.01); *G06N 20/00* (2019.01); *G06F 2212/621* (2013.01)

(58) Field of Classification Search
  CPC .............. G06F 12/0882; G06F 18/214; G06F 12/0238; G06F 13/1621; G06F 13/1668; G06N 20/00
  See application file for complete search history.

(56) References Cited

U.S. PATENT DOCUMENTS

| | | | |
|---|---|---|---|
| 8,345,053 B2 | 1/2013 | Jiao et al. | |
| 9,472,248 B2 | 10/2016 | Wilkerson et al. | |
| 9,837,167 B2 | 12/2017 | Moon et al. | |
| 9,940,286 B2 | 4/2018 | Duluk, Jr. et al. | |
| 10,289,484 B2 | 5/2019 | Khayat et al. | |
| 10,387,329 B2 | 8/2019 | Chang | |
| 10,417,731 B2 | 9/2019 | Surti et al. | |
| 10,789,071 B2 | 9/2020 | Nalluri et al. | |
| 11,074,187 B2 * | 7/2021 | Han | G06F 3/0659 |
| 2005/0108478 A1 | 5/2005 | Holloway et al. | |
| 2013/0091331 A1 | 4/2013 | Moraru et al. | |
| 2017/0212845 A1 * | 7/2017 | Conway | G06F 12/1027 |
| 2018/0088853 A1 | 3/2018 | Kotra et al. | |
| 2018/0285374 A1 * | 10/2018 | Koker | G06F 9/30 |
| 2018/0307984 A1 | 10/2018 | Koker et al. | |
| 2018/0315157 A1 | 11/2018 | Ould-Ahmed-Vall et al. | |
| 2019/0018806 A1 * | 1/2019 | Koufaty | G06F 12/0806 |
| 2019/0347125 A1 | 11/2019 | Sankaran et al. | |
| 2020/0012604 A1 * | 1/2020 | Agarwal | G06F 12/0815 |
| 2020/0061811 A1 | 2/2020 | Iqbal et al. | |
| 2021/0089456 A1 | 3/2021 | Bera et al. | |
| 2021/0103433 A1 | 4/2021 | Kerr et al. | |
| 2022/0244870 A1 * | 8/2022 | Duan | G06F 3/0673 |

\* cited by examiner

SYSTEMS, METHODS, AND DEVICES FOR BIAS MODE MANAGEMENT IN MEMORY SYSTEMS

CROSS-REFERENCE TO RELATED APPLICATIONS

This application claims priority to, and the benefit of, U.S. Provisional Patent Application Ser. No. 63/213,691 titled "Systems, Methods, and Apparatus for Autonomous Bias Mode Management for an Interconnect" filed Jun. 22, 2021 which is incorporated by reference.

TECHNICAL FIELD

This disclosure relates generally to memory systems, and more specifically to systems, methods, and apparatus for bias mode management in memory systems.

BACKGROUND

A coherent memory system may include a device memory that may be maintained in a coherent state with a host memory. The host and the device may access both memories using one or more coherency protocols. The system may implement a device bias mode in which the device may access the device memory without intervention by the host. The system may also implement a host bias mode in which, to access the device memory, the device may route an access request through a coherency bridge at the host.

The above information disclosed in this Background section is only for enhancement of understanding of the background of the invention and therefore it may contain information that does not constitute prior art.

SUMMARY

A method for managing a memory system may include monitoring one or more accesses of a page of memory, determining, based on the monitoring, an access pattern of the page of memory, and selecting, based on the access pattern, a coherency bias for the page of memory. The method may further include using the coherency bias for the page of memory. The monitoring may include maintaining an indication of the one or more accesses. The determining may include comparing the indication to a threshold. Maintaining the indication may include changing the indication in a first manner based on an access of the page of memory by a first apparatus. Maintaining the indication may include changing the indication in a second manner based on an access of the page of memory by a second apparatus. The first manner may counteract the second manner. The coherency bias may be a first coherency bias, and the determining may be further based on a second coherency bias of the page of memory. The page of memory may be a first page of memory, and the method may further include using the coherency bias for a second page of memory. The first page of memory and the second page of memory may be adjacent. The page of memory may be accessed by a process, the access pattern may include a stream, and the selecting may be further based on a control transfer for the process. The page of memory may be a first page of memory, the method may further include using the coherency bias for a number of second pages of memory. The number of second pages of memory may be determined by an application. The method may further include determining the number of second pages of memory based on a profile of the one or more accesses. The number of second pages of memory may be determined by a machine learning model trained on the one or more accesses. The page of memory may be a first page of memory and the one or more accesses are one or more first accesses, the method may further include monitoring one or more second accesses of a second page of memory, and maintaining the indication based on the one or more second accesses. The page of memory may be a first page of memory, the one or more accesses are one or more first accesses, and the indication may be a first indication, the method may further include monitoring one or more second accesses of a second page of memory, wherein monitoring the one or more second accesses of the second page of memory may include maintaining a second indication of the one or more second accesses. The method may further include storing the first indication and the second indication in a table. The method may further include storing the first indication and the second indication in a tree structure. The method may further include storing the first indication in a cache. The monitoring, the determining, and the selecting are performed by a device, the page of memory may be a first page of device memory of the device, and at least one of the one or more accesses of the page of memory may be by a host comprising a second page of memory that may be coherent with the first page of memory.

A device may include a memory controller, an interconnect interface, a device coherency agent configured to maintain coherency between a first memory coupled to the memory controller and a second memory accessible to the device through the interconnect interface, and bias management logic configured to select a coherency bias for a page of the first memory based on an access pattern of the page of the first memory. The bias management logic may be configured to monitor one or more accesses of the page of the first memory, and determine, based on the monitoring, the access pattern of the page of the first memory. The coherency bias may be a first coherency bias, and the bias management logic may be configured to select the first coherency bias based on a second coherency bias of the page of the first memory and an access of the page of the first memory through the interconnect interface.

A system may include a host, a host memory coupled to the host, a device coupled to the host through an interconnect, and a device memory coupled to the device, wherein the host may include coherency logic configured to maintain coherency between the host memory and the device memory, and wherein the device may include bias management logic configured to select a coherency bias for a page of the device memory based on an access pattern of the page of the device memory. The access pattern may include one or more accesses by the host. The bias management logic may be configured to select the coherency bias for the page of the device memory autonomously from the host.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of compo

DETAILED DESCRIPTION

Figure 1A:
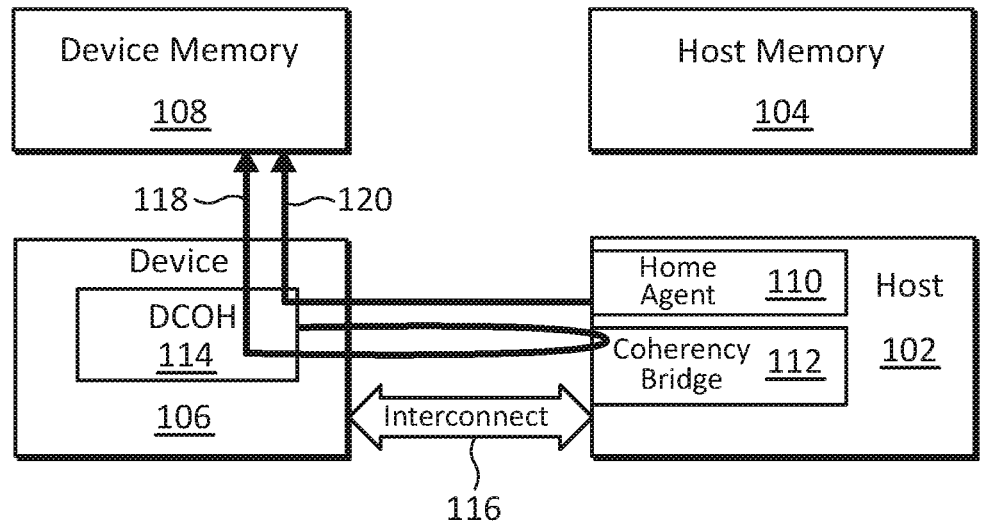
- FIG. 1A illustrates an embodiment of a coherent memory system operating in a host bias mode in accordance with example embodiments of the disclosure.

A coherent memory system in accordance with example embodiments of the disclosure may select a coherency bias mode for a page of device memory based on an access pattern of the page. The access pattern may be determined by monitoring accesses of the page by a host and by the device. In some embodiments, the accesses may be monitored by maintaining an indication of the frequency and/or recency of access by the host and the device. For example, a counter, which may be initialized to a value of zero, may be incremented each time the host accesses the page and decremented each time the device accesses the page. If the counter reaches an upper threshold, the bias mode for the page may be set to host bias. If the counter reaches a lower threshold (e.g., zero), the bias mode for the page may be changed to device bias. Depending on the implementation details, this may enable a device to dynamically and/or autonomously manage the bias mode for one or more pages of device memory, which in turn, may reduce overhead associated with managing a bias mode at an application level, a driver level, a hardware level, and/or the like. It may also provide improved performance, for example, by automatically selecting an appropriate bias mode based on runtime conditions.

Some embodiments may implement a predictive switching feature in which the bias modes of more than one page of memory, for example, adjacent pages of memory, may be switched based on an access pattern for a subset (e.g., one) of the pages. For example, an access profile for a group of adjacent memory pages may indicate that, when a first page of the group of pages is accessed by a host, one or more of the adjacent pages are likely to be accessed in the same or a subsequent access. Thus, when the first page is accessed by the host, the bias mode for all pages in the group may be switched to host bias. In some embodiments, the number and/or locations of the pages in the group may be fixed, configurable, and/or learned dynamically, for example, using a machine learning model trained on profiling of actual page accesses. Depending on the implementation details, this may improve performance, for example, by reducing overhead and/or latency associated with switching bias modes at runtime.

Some embodiments may implement one or more techniques for storing counters or other indicators for multiple memory pages. For example, some embodiments may store counters in a table having an entry for a counter for each page. As another example, some embodiments may store counters in a table in which each entry may include a single counter for a fixed-size region of multiple pages. As a further example, some embodiments may implement regions having different numbers of pages and store a counter for each region in a tree structure such as a b-tree. To avoid or reduce the search time associated with searching for an entry in the tree, some embodiments may cache counters for one or more frequently accessed pages in a cache memory. Depending on the implementation details, any of these techniques may reduce the amount of memory and/or storage used for storing bias counters.

FIG. 1A illustrates an embodiment of a coherent memory system operating in a host bias mode in accordance with example embodiments of the disclosure. The system illustrated in FIG. 1A may include a host 102, a host memory (which may also be referred to a host-attached memory or system memory) 104, a device 106, and a device memory (which may also be referred to as a device-attached memory) 108. The host 102 may include a home agent 110 and a coherency bridge 112. The device 106 may include a device coherency (DCOH) agent (which may also be referred to as a DCOH) 114. The host 102 and device 106 may communicate through an interconnect 116 and maintain coherency between the host memory and the device memory using one or more coherency protocols. In some embodiments, the home agent 110 may control cache coherency between the host memory 104 and the device memory 108, resolve caching conflicts across the system, and/or the like. In some embodiments, the DCOH 114 may implement a set of commands such as requests, snoops, and/or the like.

For purposes of illustration, the embodiment illustrated in FIG. 1A may be described in a context in which the interconnect 116 and one or more coherency protocols may be implemented with Compute Express Link (CXL) and the CXL.cache and CXL.mem protocols (which may also be written as cxl.cache and cxl.mem). However, embodiments may also be implemented with any other interfaces and/or protocols including cache coherent and/or memory semantic interfaces and/or protocols such as Gen-Z, Coherent Accelerator Processor Interface (CAPI), Cache Coherent Interconnect for Accelerators (CCIX), and/or the like.

In a CXL implementation, the device 106 may be implemented as a CXL Type-2 device such as an accelerator, a storage device, a network interface card (NIC), a graphics processing unit (GPU), a neural processing unit (NPU), a tensor processing unit (TPU), a caching device, a memory buffer, and/or the like. In a CXL implementation, the device 106 may also be implemented as a Type-1 device, a Type-3 device, and/or any other type of device including types that may be defined and/or developed in the future. In some embodiments, the device memory 108, and/or coherency thereof, may be managed by the host 102 and thus may also be referred to as host-managed device memory.

In some embodiments, in both host bias mode and device bias mode (which may also be referred to as host bias state and device bias state), one or more pages of the device memory 108 may be shared between the host 102 and the device 106. However, in host bias mode, coherent accesses by the host 102 of the device memory 108 as indicated by arrow 120 may be prioritized such that the device memory 108 may appear like host memory to the device. Thus, to access device memory 108 in host bias mode, the device 106 may be required to interact with the coherency bridge 112 using a cache-coherent protocol such as cxl.cache to route access requests for the device memory 108 through the host 102 as shown by arrow 118. In some embodiments, this may be required, for example, because data in the device memory 108 may be cached at the host 102. Thus, in host bias mode, the device 106 may experience a relatively high latency, low throughput, and/or the like when accessing device memory 108.

Figure 1B:
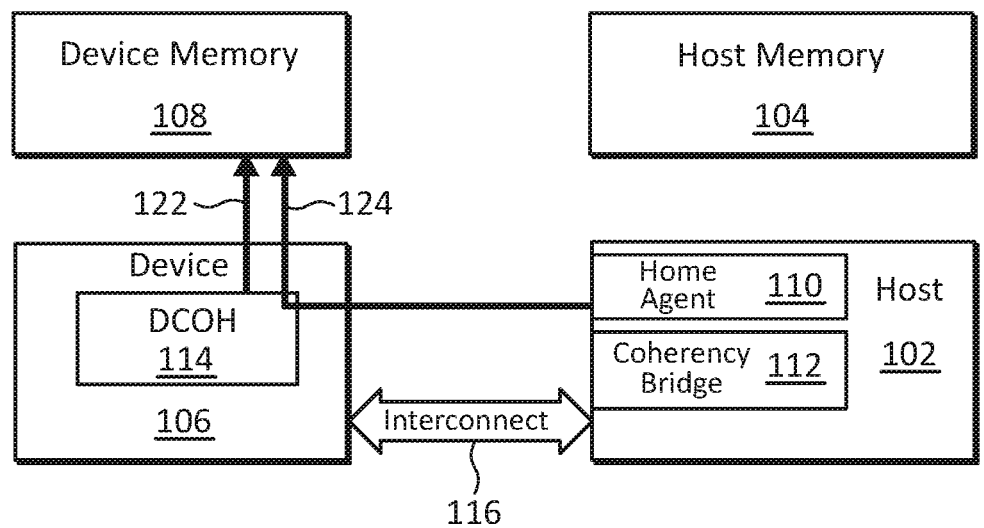
FIG. 1B illustrates an embodiment of a coherent memory system operating in a device bias mode in accordance with example embodiments of the disclosure.

FIG. 1B illustrates an embodiment of a coherent memory system operating in a device bias mode in accordance with example embodiments of the disclosure. The embodiment illustrated in FIG. 1B may be similar to that illustrated in FIG. 1A, but operating in device bias mode.

In device bias mode, the device 106 may access device memory 108 without interacting with the host 102 as shown by arrow 122. This may enable the device 106 to access the device memory 108 with lower latency, higher throughput, and/or the like. Although the host 102 may still access the device memory 108 in device bias mode as shown by arrow 124, in some embodiments, the system may ensure that the host 102 does not cache the device memory 108, and therefore, may experience a relatively high latency, low throughput, and/or the like when accessing device memory 108. Thus, device bias mode may enable the device 106 to operate at relatively high speeds, for example, when performing one or more operations offloaded to the device 106 by the host 102.

In the embodiments illustrated in FIG. 1A and FIG. 1B, the device 106 may be implemented, for example, as a storage device, an accelerator, a GPU, a NIC, an NPU, a TPU, and/or the like or any combination thereof. The host 102 may be implemented with any suitable apparatus including one or more central processing units (CPUs), for example, complex instruction set computer (CISC) processors such as x86 processors and/or reduced instruction set computer (RISC) processors such as ARM processors, GPUs, NPUs, TPUs, and/or the like or any combination thereof, arranged to operate, for example, as one or more application servers, storage services, compute servers, and/or the like.

In the embodiments illustrated in FIG. 1A and FIG. 1B, the host memory 104 and device memory 108 may be implemented with any type of memory, for example, volatile memory such as dynamic random access memory (DRAM), static random access memory (SRAM), nonvolatile memory such as not-AND (NAND) flash memory, persistent memory such as cross-gridded nonvolatile memory, memory with bulk resistance change, phase change memory (PCM) and/or the like, and/or any combination thereof.

In some embodiments, when switching one or more pages of device memory 108 from host bias mode to device bias mode, a cache flush may be executed through a cache-coherent protocol such as cxl.cache to invalidate potential cached data at the host 102. The host 102 may also send an invalidate response to the device 106. Similarly, when switching from device bias mode to host bias mode, the host 102 may invalidate one or more cache lines at the device 106 through a cache-coherent protocol such as cxl.mem. The device 106 may also flush one or more caches and return an acknowledgment to the host 102.

Thus, in some embodiments, when either the host 102 or the device 106 accesses a page of device memory 108 when the page is in the opposite bias mode (that is, the host accesses a page of device memory 108 when the page is in device bias mode, or the device accesses a page of device memory 108 when the page is in host bias mode), the access may result in a coherency overhead (e.g., software overhead for making one or more calls to an application programming interface (API)) that may degrade performance. In some embodiments, switching one or more pages of device memory 108 may incur a substantial overhead, therefore, it may be beneficial to implement bias mode switching intelligently.

Figure 2A:
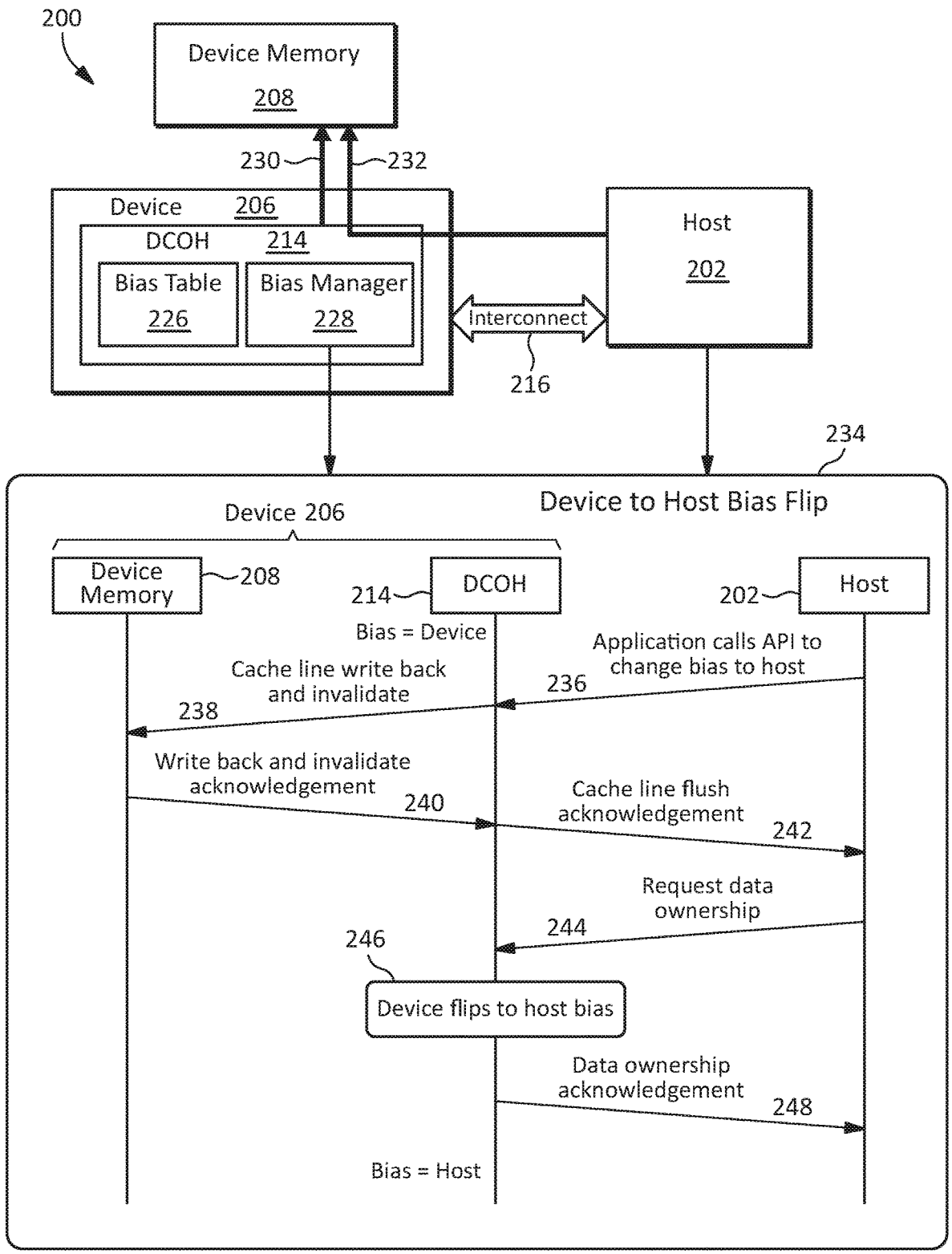
FIG. 2A illustrates an embodiment of a coherent memory system and an embodiment of a bias mode switching operation performed by the system in which the system switches a page from device bias mode to host bias mode in accordance with example embodiments of the disclosure.

FIG. 2A illustrates an embodiment of a coherent memory system and an embodiment of a bias mode switching operation performed by the system in which the system switches a page from device bias mode to host bias mode in accordance with example embodiments of the disclosure.

The memory system 200 illustrated in FIG. 2A may include a host 202, a device 206, and a device memory 208 similar to those in the embodiment illustrated in FIG. 1A. The device 206 may include a DCOH 214 which may have a bias table 226 and a bias manager 228. The bias table 226 may store the bias mode of one or more pages of the device memory 208. The bias manager 228 may perform one or more operations associated with implementing and/or switching a bias mode of one or more pages of the device memory 208.

In this example, the host 202 and device 206 may communicate through an interconnect 216 using a cache-coherent protocol (e.g., a CXL protocol such as one or more of the cxl.cache and/or cxl.mem protocols), but other types of interconnect 216 and/or coherent protocols may be used.

The device 206 may access the device memory 208 as shown by arrow 230 in a device bias mode before the switching operation 234 is performed and in a host bias mode after the switching operation 234 is performed. The host 202 may access the device memory 208 as shown by arrow 232 in a device bias mode before the switching operation 234 is performed and in a host bias mode after the switching operation 234 is performed.

The switching operation 234 is illustrated as a timeline with time progressing downward. The switching operation 234 may begin with a page of device memory 208 in device bias mode. This may be indicated, for example, with an entry for the page in the bias table 226 indicating that the page is in device bias mode. At operation 236, an application (e.g., programmed by a programmer) may call an API to request a change of the bias of the page to host bias mode. Operation 236 may be executed, for example, by the API sending the request through a driver at the host, which may then be sent by the driver to one or more hardware resources such as the interconnect 216 to process the request, including communicating with the DCOH 214 at the device 206.

At operation 238, the DCOH 214 may send a cache line write back request and invalidate one or more cache lines at the device memory 208. At operation 240, the device memory 208 may respond to the DCOH 214 with an acknowledgment of the write back and invalidation request. At operation 242, the DCOH 214 may send an acknowledgment of the cache line flush to the host 202. At operation 244, the host 202 may send a request for data ownership to the DCOH 214. At operation 246, the bias mode of the page of memory 208 may switch to host bias mode. This may be indicated, for example, by changing the corresponding entry for the page in the bias table 226 to indicate that the page is now in host bias mode. At operation 248, the DCOH 214 may send an ownership acknowledgment to the host 202. The operation 234 may then conclude with the page of memory 208 in host bias mode.

Figure 2B:
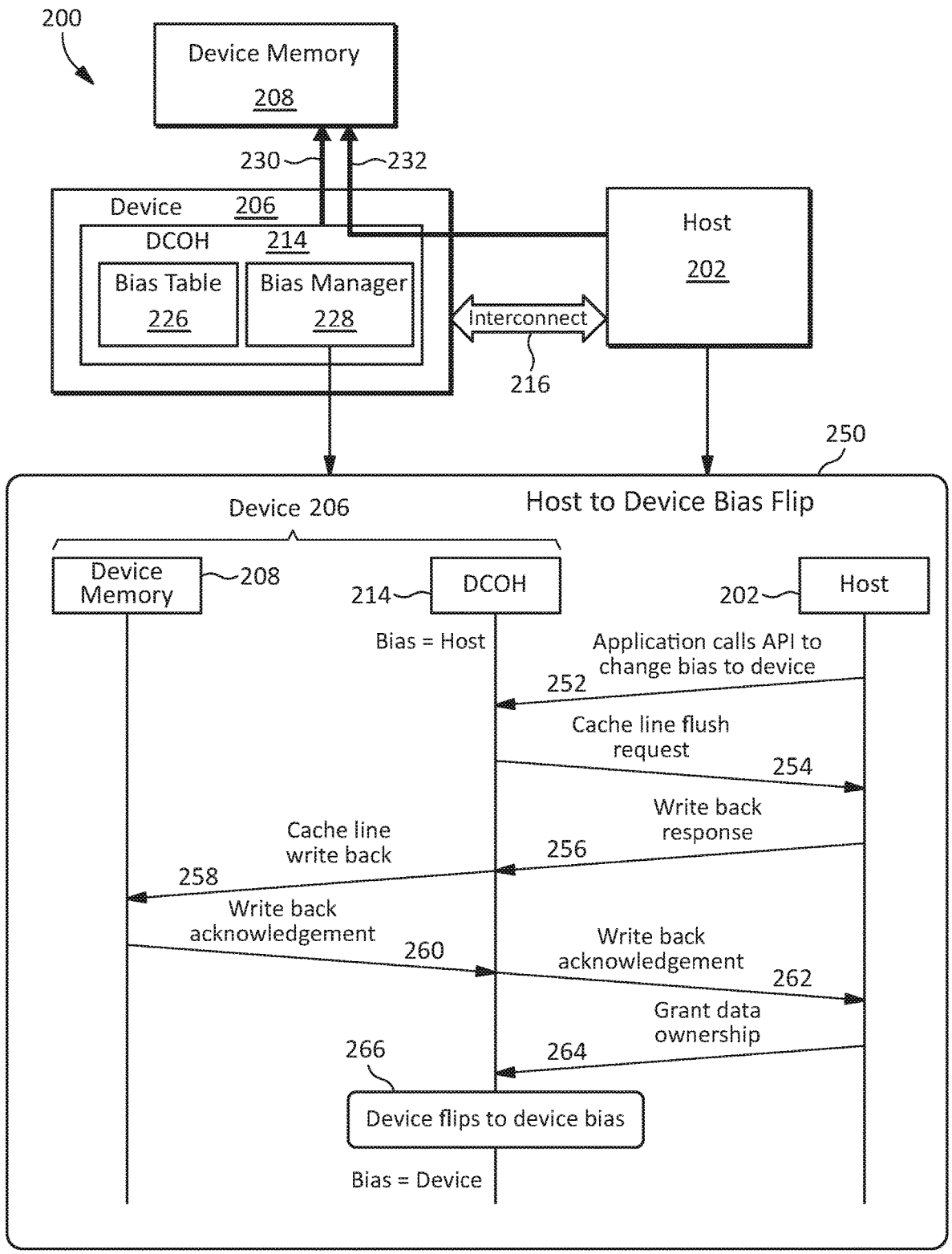
FIG. 2B illustrates an embodiment of a coherent memory system and an embodiment of a bias mode switching operation performed by the system in which the system switches a page from host bias mode to device bias mode in accordance with example embodiments of the disclosure.

FIG. 2B illustrates an embodiment of a coherent memory system and an embodiment of a bias mode switching operation performed by the system in which the system switches a page from host bias mode to device bias mode in accordance with example embodiments of the disclosure.

The memory system 200 illustrated in FIG. 2B may be similar to that illustrated in FIG. 2A. The device 206 may access the device memory 208 as shown by arrow 230 in host bias mode before the switching operation 250 is performed and in device bias mode after the switching operation 250 is performed. The host 202 may access the device memory 208 as shown by arrow 232 in a host bias mode before the switching operation 250 is performed and in a device bias mode after the switching operation 250 is performed.

The switching operation 250 may begin with a page of device memory 208 in host bias mode. This may be indicated, for example, with an entry for the page in the bias table 226 indicating that the page is in host bias mode. At operation 252, an application (e.g., programmed by a programmer) may call an API to request a change of the bias of the page to device bias mode. Operation 252 may be executed, for example, by the API sending the request through a driver at the host, which may then be sent by the driver to one or more hardware resources such as the interconnect 216 to process the request, including communicating with the DCOH 214 at the device 206.

At operation 254, the DCOH 214 may send a cache line flush request to the host 202. At operation 256, the host 202 may send a write back request to the DCOH 214. At operation 258, the DCOH 214 may perform a cache line write back on the device memory 208. At operation 260, the device memory 208 may respond to the DCOH 214 with a write back acknowledgment. At operation 262, the DCOH 214 may forward the write back acknowledgment to the host 202. At operation 264, the host 202 may send a data ownership grant to the DCOH 214. At operation 266, the bias mode of the page of memory 208 may switch to device bias mode. This may be indicated, for example, by changing the corresponding entry for the page in the bias table 226 to indicate that the page is now in device bias mode. The operation 250 may then conclude with the page of memory 208 in host bias mode.

Figure 3:
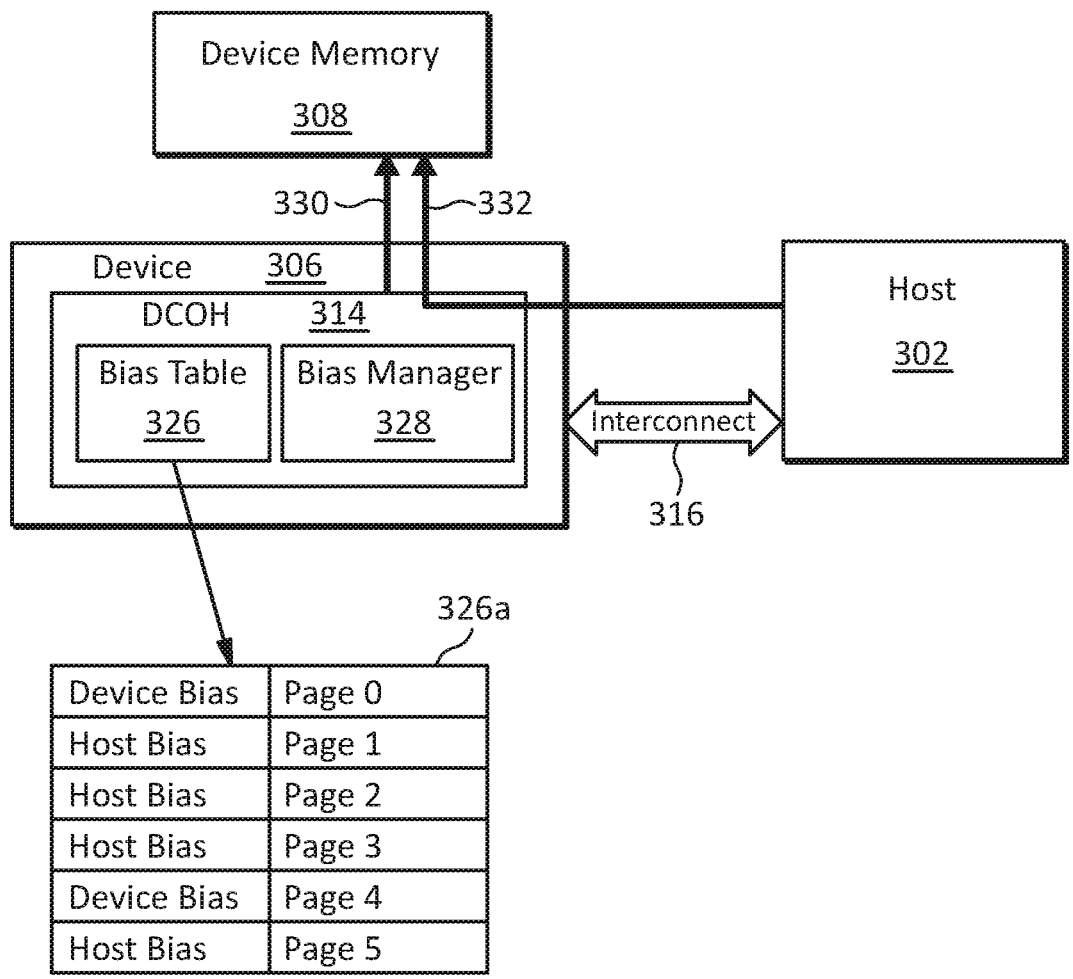
FIG. 3 illustrates an embodiment of a coherent memory system including a bias table in accordance with example embodiments of the disclosure.

FIG. 3 illustrates an embodiment of a coherent memory system including a bias table in accordance with example embodiments of the disclosure. The system illustrated in FIG. 3 may include a host 302, device 306, an interconnect 316, and device memory 308 similar to those in the embodiments illustrated in FIG. 2A and FIG. 28. In the system illustrated in FIG. 3, an example of a bias table 326 is shown in detail as table 326a. In some embodiments, each row of the bias table 326a may include an indication of a bias mode (e.g., a host bias mode or a device bias mode) for each page of the device memory 308 listed in the table. In sonic embodiments, bias mode entries in the bias table 326a may reflect the latest of the corresponding memory page, The bias table 326a illustrated in FIG. 3 may be used, for example, to implement the bias mode switching operations illustrated in FIG. 2A and FIG. 2B.

Figure 4:
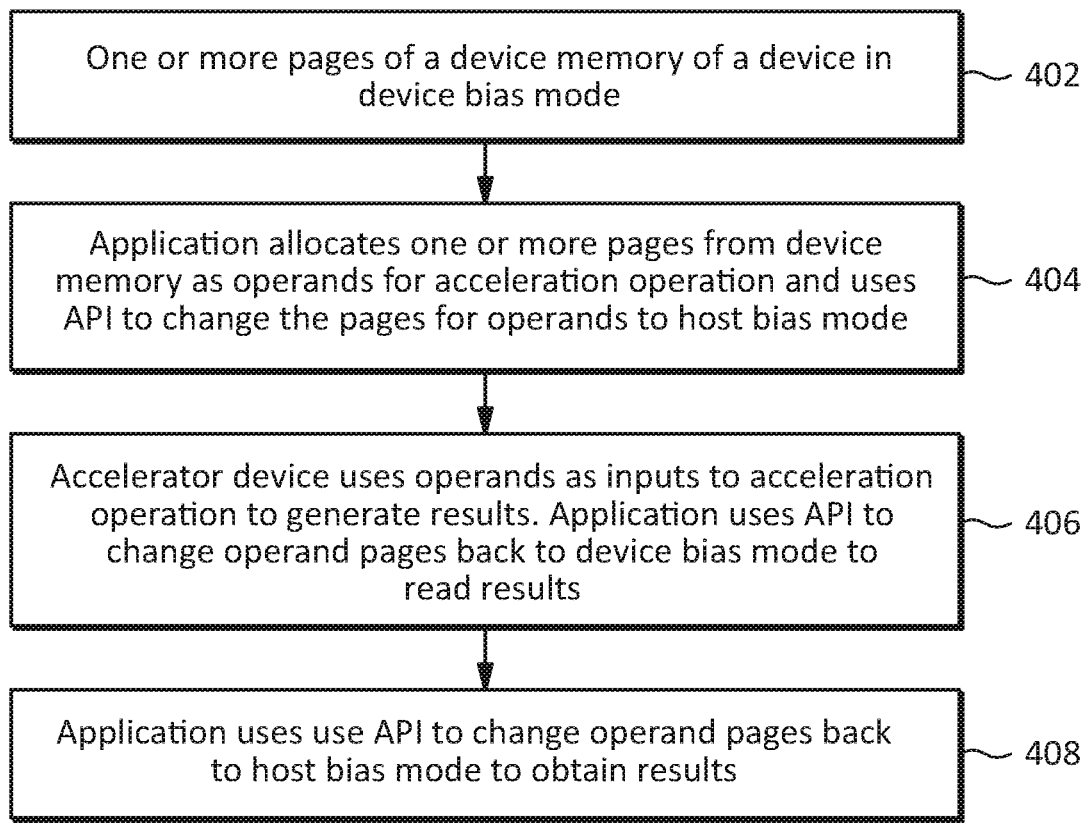
FIG. 4 illustrates an embodiment of a method for a work submission by a host and completion by a device in accordance with example embodiments of the disclosure.

FIG. 4 illustrates an embodiment of a method for a work submission by a host and completion by a device in accordance with example embodiments of the disclosure. The method illustrated in FIG. 4 may be implemented using any of the embodiments of systems and/or methods illustrated in FIG. 1A through FIG. 3. The method may begin at operation 402 with one or more pages of a device memory of a device in device bias mode. For purposes of illustration, the device may be assumed to be an accelerator device, but the principles illustrated in FIG. 4 may be applied to any type of device.

At operation 404, a programmer (e.g., through an application) may allocate one or more pages from device memory as operands that may be used as one or more inputs for an acceleration operation and use an API (e.g., Open Computing Language (OpenCL) API) to change the pages for the operands to host bias mode. Depending on the implementation details, this may not involve data copies and/or cache flushes.

At operation 406, the accelerator device may use the operands as inputs to the acceleration operation which may generate results. To store the results, the programmer may use the API to change the operand pages back to device bias mode. Depending on the implementation details, the accelerator device may flush the host cache by sending a cache flush command to the host, for example, through a cache-coherent protocol such as the cxl.cache protocol. Thus the accelerator device may execute the acceleration operation with little or no host related coherency overhead.

At operation 408, to obtain the results of the acceleration operation from the accelerator device, the programmer may use the API to change the operand pages back to host bias mode. The host may then retrieve the results from the operand pages of the device memory.

For each of the three bias mode changes executed in the embodiment illustrated in FIG. 4, the method may incur the overhead associated, for example, with the embodiments of bias mode changes illustrated in FIG. 2A and FIG. 2B. This overhead may include various components such as the burden on a programmer and/or an application of managing the static bias modes for various pages of device memory, as well as the resources expended at the host to send a request for a bias mode change through an API, a driver, hardware, and/or the like. Moreover, the overhead associated with performing a bias mode change at the host for a page of device memory may have a cumulative effect that may prevent effective scaling by a host for an increasing number of devices and/or an increasing number of processes that may each use multiple pages of device memory. Moreover, the use of a bias table such as table 326a illustrated in FIG. 3 may consume a relatively large amount of memory and/or storage.

Figure 5:
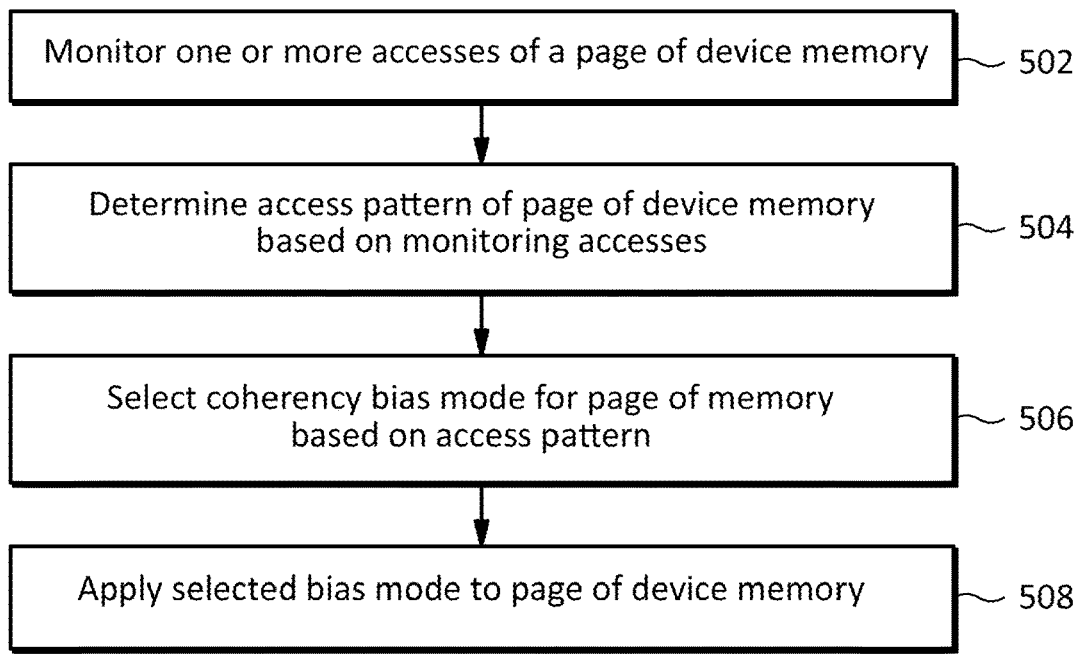
FIG. 5 illustrates an embodiment of a method for bias mode management in a coherent memory system in accordance with example embodiments of the disclosure.

FIG. 5 illustrates an embodiment of a method for bias mode management in a coherent memory system in accordance with example embodiments of the disclosure. The embodiment illustrated in FIG. 5 may enable a device to manage one or more coherency bias modes for one or more pages of a device-attached memory, for example, dynamically and/or autonomously from a host.

At operation 502 a device may monitor one or more accesses of a page of device memory. This may include accesses by both the device and a host which may have a host memory that is maintained in a coherent state with the device memory. In some embodiments, the device may monitor the accesses by maintaining a counter or other indication of the frequency and/or recency of accesses by the host and the device. For example, the device may increment a counter each time the host accesses the page and decrement the counter each time the device accesses the page.

At operation 504, the device may determine an access pattern of the page of device memory based on monitoring the accesses. For example, if a counter is used to monitor accesses as described above, the device may determine the access pattern by comparing the counter to one or more threshold values.

At operation 506, the device may select a coherency bias mode for the page of memory based on the access pattern determined at operation 504. For example, the device may set the bias mode for the page to host bias if the counter reaches an upper threshold and to device bias if the counter reaches a lower threshold. In some embodiments with a 1-bit counter, the device may flip the bias mode each time the page is accessed by an apparatus that is the opposite of the bias mode (e.g., the device may change the mode to device bias when the page is accessed by the device when the page is in host bias mode, and the device may change the mode to host bias when the page is accessed by the host when the page is in device bias mode).

At operation 508, the device may apply the selected bias mode to the page of device memory. In some embodiments, this may be performed autonomously from the host. For example, the device may change the bias mode of the page of memory without an application running on the host needing to make an API call. In some embodiments, one or more of the operations 502, 504, 506, and/or 508 may be performed dynamically. For example, the device may repeat the method illustrated in FIG. 5 continuously at runtime to adaptively change the bias mode for a page based on changing access patterns for the page. Thus, in some embodiments, the method illustrated in FIG. 5 may provide improved performance, for example, by automatically selecting an appropriate bias mode for a page based on runtime conditions.

For purposes of illustration, the embodiment illustrated in FIG. 5 may be described in the context of a device monitoring a page of device memory being accessed by the device and/or a host and the device selecting and applying the selected bias mode to the page. However, the principles may be applied in many other contexts in which the page of device memory may be accessed by multiple hosts and/or processes running on the host, one or more other devices (e.g., peer devices) and/or processes running on the other devices, and/or the like. As another example, the principles may be applied to systems, methods, and/or devices in which the roles of the host and device may be reversed. Moreover, the page size may be implemented with any size such as 512 bytes, 4K bytes, 8K bytes, and/or the like, and/or combinations thereof. Additionally, some embodiments may be implemented with more than two different possible coherency bias modes for a page of device memory.

In the embodiment illustrated in FIG. 5, as well as the other embodiments described herein, the operations are example operations. In some embodiments, some operations may be omitted and/or other operations may be included. Moreover, in some embodiments, the temporal and/or spatial order of the operations may be varied.

Figure 6:
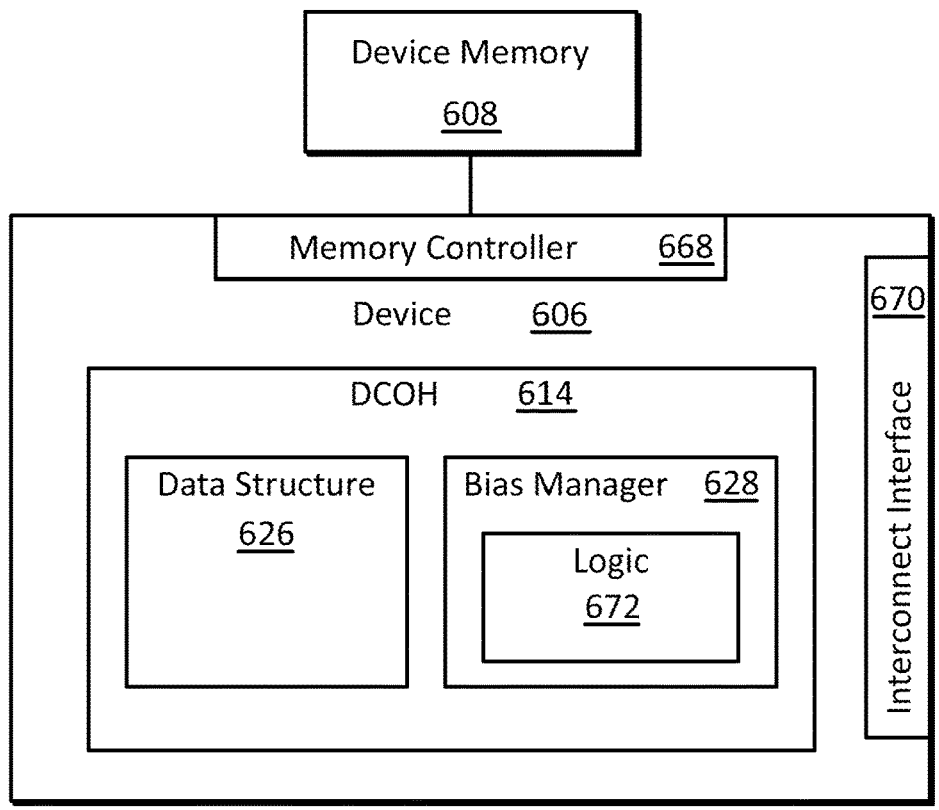
FIG. 6 illustrates an embodiment of a device with coherency bias mode management in accordance with example embodiments of the disclosure.

FIG. 6 illustrates an embodiment of a device with coherency bias mode management in accordance with example embodiments of the disclosure. The device 606 illustrated in FIG. 6 may include a memory controller 668 to interface a device memory 608 to device 606, and an interconnect interface 670 to enable the device 606 to communicate with a host. The device 606 may further include a DCOH 614 having a data structure 626 to store data relating to one or more bias modes for one or more pages of the device memory 608. The DCOH 614 may also include bias management logic 628 which may further include logic 672 that may implement any of the features relating to bias mode management disclosed herein. For example, the logic 672 may include logic to perform one or more of the operations illustrated in FIG. 5 and/or any of the figures below.

The memory controller 668 may implement any type of memory interface such as double data rate (DDR), DDR2, DDR3, DDR4, etc., Open Memory Interface (OMI), and/or the like. The interconnect interface 670 may implement any interface such as CXL, CAPI, CCIX, and/or the like. Other examples of suitable interfaces and/or protocols that may be used to implement a coherent memory system may include Peripheral Component Interconnect Express (PCIe), Non-volatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), Fibre-Channel, InfiniBand, Serial ATA (SATA), Small Computer Systems Interface (SCSI), Serial Attached SCSI (SAS), iWARP, and/or the like, or any combination thereof.

The device 606 may be implemented as any type of device that may use one or more bias modes. In a CXL implementation, the device 606 may be implemented as a CXL Type-2 device such as an accelerator, a storage device, a NIC, a GPU, an NPU, a TPU, a caching device, a memory buffer, and/or the like. In a CXL implementation, the device 106 may also be Implemented as a Type-1 device, a Type-3 device, and/or any other type of device including types that may be defined and/or developed in the future.

Any of the components illustrated in FIG. 6 including the DCOH 614, the data structure 626, the bias management logic 628 and/or the logic 672 may be implemented with hardware, software, or any combination thereof including combinational logic, sequential logic, one or more timers, counters, registers, state machines, volatile memories, nonvolatile memories, complex programmable logic devices (CPLDs), field programmable gate arrays (FPGAs), application specific integrated circuits (ASICs), CPUs, NPUs, TPUs, and/or the like, executing instructions stored in any type of memory. In some embodiments, one or more components may be implemented as a system-on-chip (SOC).

The configuration of components illustrated in FIG. 6 are exemplary only, and they may be arranged differently in other embodiments. For example, in other embodiments, any of the separate components may be combined into single components, and any of the single components may be distributed among multiple components.

Figure 7:
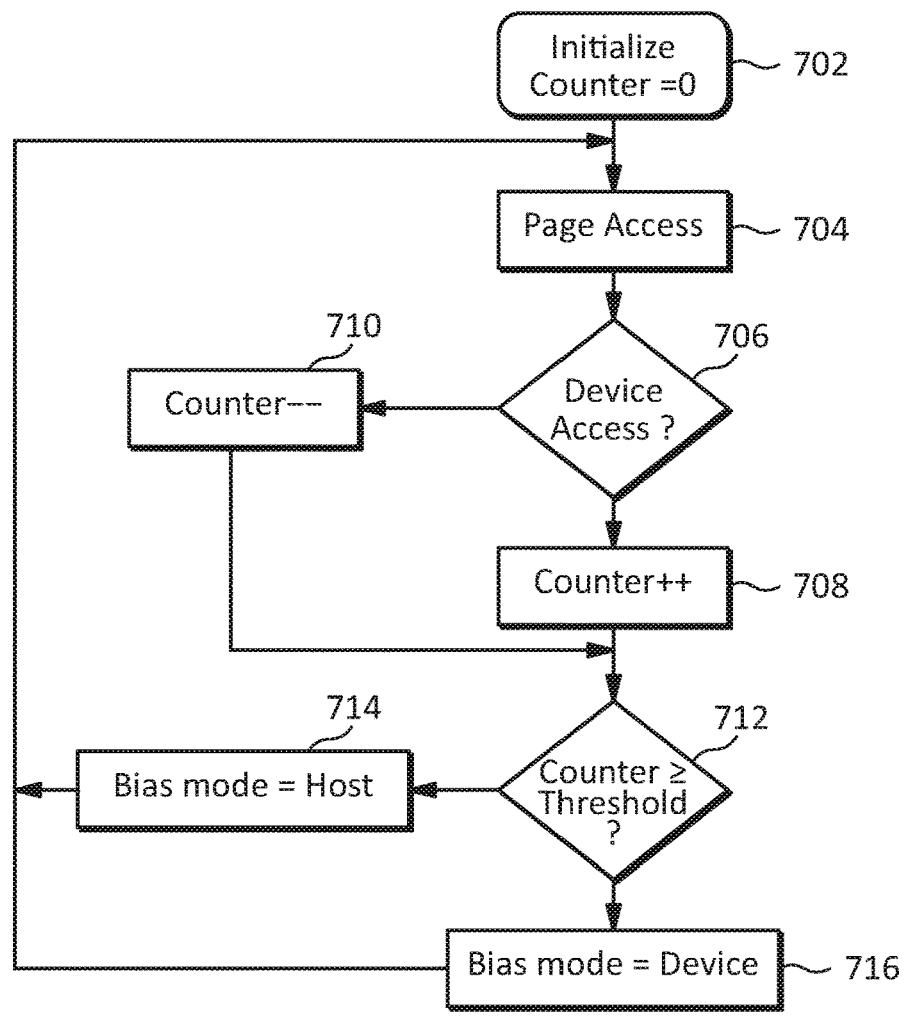
FIG. 7 illustrates an embodiment of a method for coherency bias mode management in accordance with example embodiments of the disclosure.

FIG. 7 illustrates an embodiment of a method for coherency bias mode management in accordance with example embodiments of the disclosure. The method illustrated in FIG. 7 may be implemented, for example, with the device illustrated in FIG. 6.

Referring to FIG. 7, the method may begin at operation 702 where a counter may be initialized to zero. At operation 704, the device may wait for and detect an access of a page of device memory. At operation 706, the device may determine whether the page access was by the device. If the page was not accessed by the device (e.g., the page was accessed by a host), the device may increment the counter at operation 708, then proceed to operation 712. However, at operation 706, if the device determines that the page was accessed by the device, the counter may be decremented, and the method may proceed to operation 712. In some embodiments, the value of the counter may be limited to prevent it from exceeding a positive or negative threshold (e.g., to prevent it from going below zero).

At operation 712, the device may compare the counter to a threshold. If the counter is greater than or equal to the threshold, it may indicate that host accesses of the page may have been most frequent and/or recent and therefore, the page is more likely to be accessed next by the host again. Therefore, the method may proceed to operation 714 where the bias mode for the page may be set to host bias. However, if at operation 712 the counter is less than the threshold, this may indicate that device accesses of the page may have been most frequent and/or recent and therefore, the page is more likely to be accessed next by the device again. Therefore, the method may proceed to operation 716 where the bias mode for the page may be set to device bias. The method may then loop back from either of operations 714 or 716 to operation 704 wherein it may again wait for and detect an access of a page of device memory.

Thus, the method illustrated in FIG. 7 may enable a device to implement a low-overhead and/or autonomous bias mode management technique that may automatically adjust one or more bias modes for one or more pages by tracking page accesses. The counter may be implemented with any number of bits, and any suitable values may be used for the threshold.

In some embodiments, a 1-bit counter may be used, in which case, the coherency bias mode of a page may be flipped each time a page in device bias mode is accessed by a host, or each time a page in host bias mode is accessed by a device.

Figure 8:
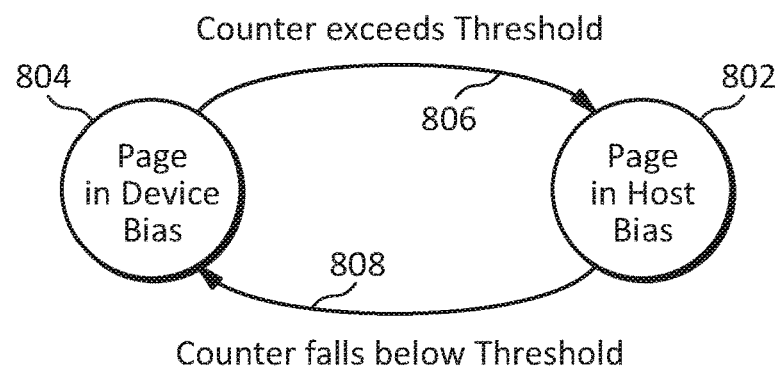
FIG. 8 illustrates a state diagram of a coherency bias mode management method in accordance with example embodiments of the disclosure.

FIG. 8 illustrates a state diagram of a coherency bias mode management method in accordance with example embodiments of the disclosure. The embodiment illustrated in FIG. 8 may be implemented, for example, using the device illustrated in FIG. 7 and/or the methods illustrated in FIG. 5 and FIG. 6.

In the embodiment illustrated in FIG. 8, a page of device memory may be in either a host bias state 802 or a device bias state 804. If the page is in host bias state 802 and the counter falls below the threshold, the page may transition to device bias mode 804 as shown by arrow 808. If the page is in device bias state 804 and the counter meets or exceeds the threshold, the page may transition to host bias mode as shown by arrow 806.

Figure 9A:
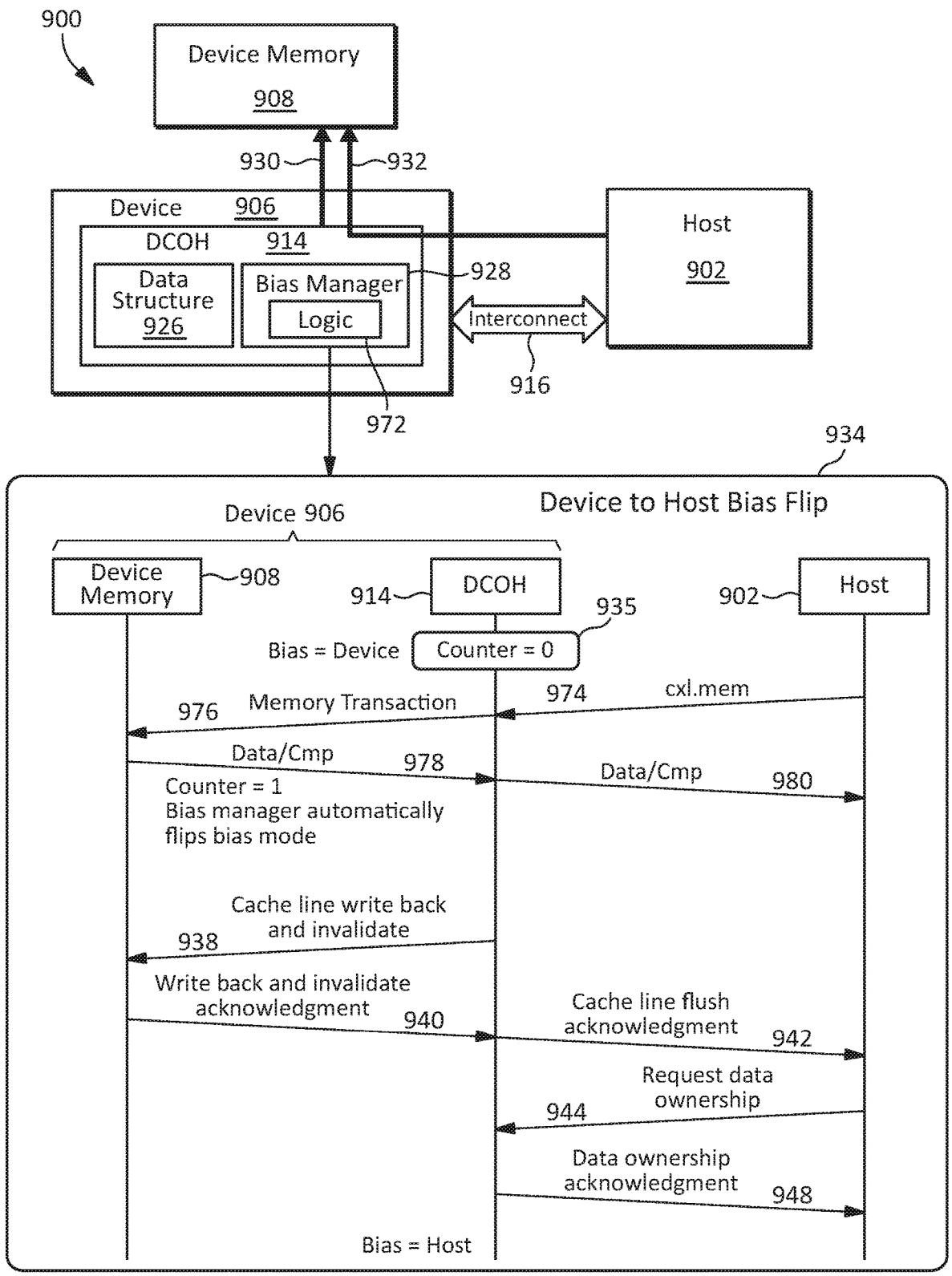
FIG. 9A illustrates an embodiment of a coherent memory system and an embodiment of a bias mode switching operation performed by the system in which the system switches a page from device bias mode to host bias mode in accordance with example embodiments of the disclosure.

FIG. 9A illustrates an embodiment of a coherent memory system and an embodiment of a bias mode switching operation performed by the system in which the system switches a page from device bias mode to host bias mode in accordance with example embodiments of the disclosure.

The memory system 900 illustrated in FIG. 9A may include a host 902, a device 906, and a device memory 908 that may generally be similar to those in the embodiments illustrated in FIG. 2A. However, the DCOH 914 in the device 906 may include a data structure 926 that may store one or more bias modes for one or more pages of the device memory 908 in an alternative format such as a tree structure, a table for multiple-page regions, and/or the like as described below. Moreover, the bias manager 928 of the DCOH 914 may include logic 972 to implement any of the features relating to bias mode management disclosed herein.

In this example, the host 902 and device 906 may communicate through an interconnect 916 using a cache-coherent protocol (e.g., a CXL protocol such as one or more of the cxl.cache and/or cxl.mem protocols), but other types of interconnect 916 and/or coherent protocols may be used.

The device 906 may access the device memory 908 as shown by arrow 930 in a device bias mode before the switching operation 934 is performed and in a host bias mode after the switching operation 934 is performed. The host 902 may access the device memory 908 as shown by arrow 932 in a device bias mode before the switching operation 934 is performed and in a host bias mode after the switching operation 934 is performed.

The switching operation 934 is illustrated as a timeline with time progressing downward. The switching operation 934 may begin with a page of device memory 908 in device bias mode. At operation 935, the logic 972 may initialize a 1-bit counter to zero. In the embodiment illustrated in FIG. 9A, rather than waiting for an application to request a change of a bias mode for the page of the device memory 908, the logic 972 may monitor one or more accesses of the page of device memory. At operation 974, the host 902 may initiate an access of the page of device memory 908, for example, using a cache-coherent protocol such as cxl.mem. At operation 976, the memory access may be executed by the device memory 908 which may respond, at operation 978 by sending either the requested data or a completion message to the DCOH 914. At operation 980, the DCOH 914 may forward either the data or the completion message to the host 902.

By monitoring the access by the host 902 of the page of device memory 908, the logic 972 may determine the access pattern and, in accordance with the methods described with respect to FIG. 5, FIG. 7, and FIG. 8, the logic may increment the counter to 1 which may cause the bias mode for the page to automatically flip to host bias mode.

To complete the bias mode transition in a coherent manner, the method may then proceed to operation 938 where the DCOH 914 may send a cache line write back request and invalidate one or more cache lines at the device memory 908. At operation 940, the device memory 908 may respond to the DCOH 914 with an acknowledgment of the write back and invalidation request. At operation 942, the DCOH 914 may send an acknowledgment of the cache line flush to the host 902. At operation 944, the host 902 may send a request for data ownership to the DCOH 914. At operation 946, the bias mode of the page of memory 908 may switch to host bias mode. This may be indicated, for example, by changing the corresponding entry for the page in the data structure 926 to indicate that the page is now in host bias mode. At operation 946, the DCOH 914 may send an ownership acknowledgment to the host 902. The operation 934 may then conclude with the page of memory 908 in host bias mode.

Figure 9B:
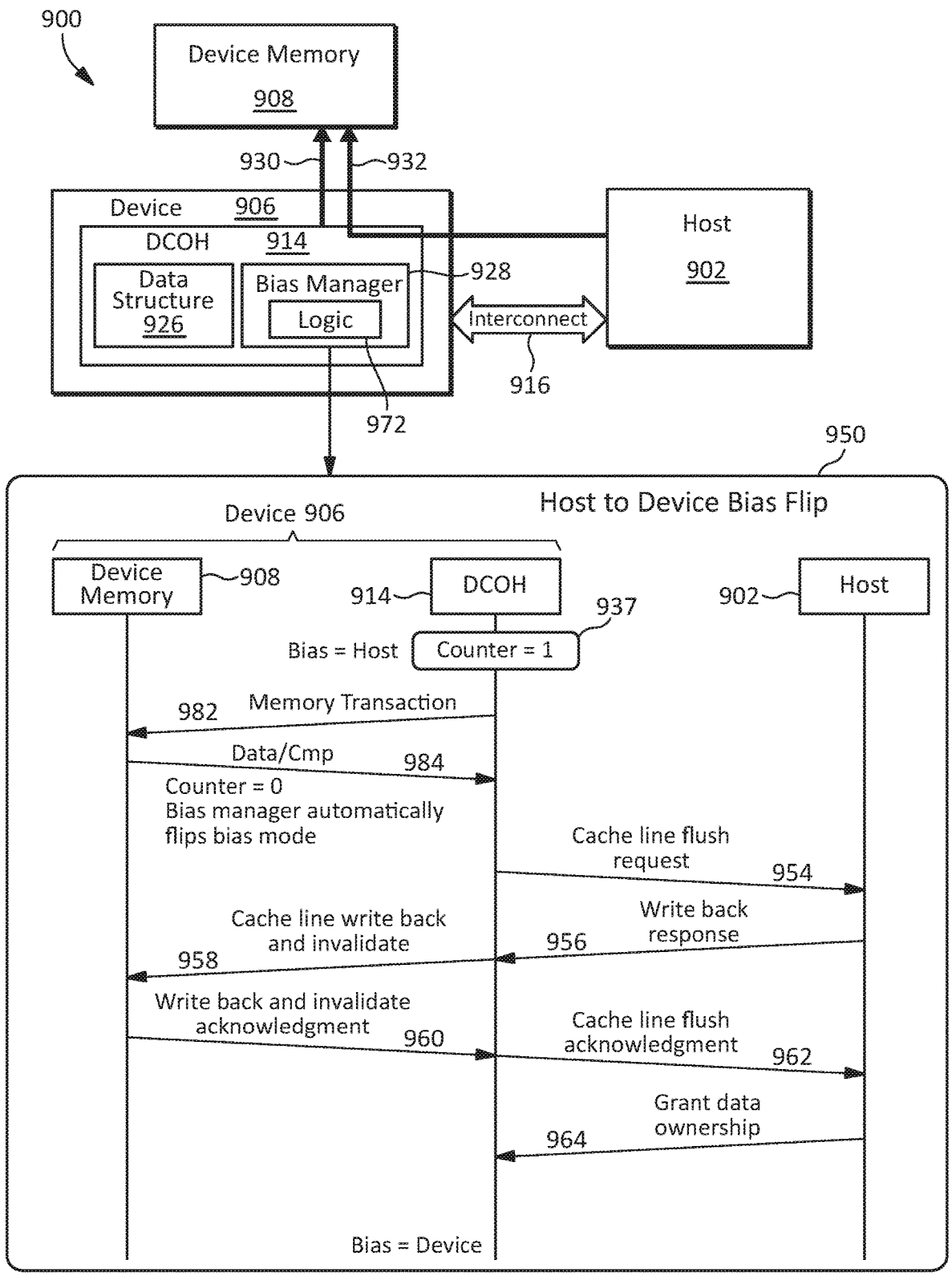
FIG. 9B illustrates an embodiment of a coherent memory system and an embodiment of a bias mode switching operation performed by the system in which the system switches a page from host bias mode to device bias mode in accordance with example embodiments of the disclosure.

FIG. 9B illustrates an embodiment of a coherent memory system and an embodiment of a bias mode switching operation performed by the system in which the system switches a page from host bias mode to device bias mode in accordance with example embodiments of the disclosure. The memory system 900 illustrated in FIG. 9B be similar to that illustrated in FIG. 9A.

The switching operation 950 may begin with a page of device memory 908 in host bias mode. At operation 937, the logic 972 may initialize the 1-bit counter to one if it was not already at one from a previous bias mode switching operation. The logic 972 may monitor one or more accesses of the page of device memory. At operation 982, the device may initiate an access of the page of device memory 908, for example, using cxl.cache. At operation 984, the memory access may be executed by the device memory 908 which may respond by sending either the requested data or a completion message to the DCOH 914.

By monitoring the access by the device 906 of the page of device memory 908, the logic 972 may determine the access pattern and, in accordance with the methods described with respect to FIG. 5, FIG. 7, and FIG. 8, the logic may decrement the counter to 0 which may cause the bias mode for the page to automatically flip to device bias mode.

To complete the bias mode transition in a coherent manner, the method may then proceed to operation 954, at which the DCOH 914 may send a cache line flush request to the host 902. At operation 956, the host 902 may send a write back request to the DCOH 914. At operation 958, the DCOH 914 may perform a cache line write back on the device memory 908. At operation 960, the device memory 908 may respond to the DCOH 914 with a write back acknowledgment. At operation 962, the DCOH 914 may forward the write back acknowledgment to the host 902. At operation 964, the host 902 may send a data ownership grant to the DCOH 914. At operation 966, the bias mode of the page of memory 908 may switch to device bias mode. This may be indicated, for example, by changing the corresponding entry for the page in the data structure 926 to indicate that the page is now in device bias mode. The operation 950 may then conclude with the page of memory 908 in host bias mode.

In some embodiments as illustrated with respect to FIG. 9A and FIG. 9B, bias mode management methods and/or apparatus in accordance with example embodiments of the disclosure may autonomously change and/or manage a bias mode for a page of device memory. Depending on the implementation details, this may reduce overhead associated, for example, with a burden on a programmer and/or an application of managing the static bias modes for various pages of device memory, as well as the resources expended at the host to send a request for a bias mode change through an API, a driver, hardware, and/or the like. Moreover, by reducing overhead associated with performing a bias mode change at the host for a page of device memory, some embodiments may enable a system with coherent memories to scale more effectively.

Some additional principles of this disclosure relate to one or more techniques for predictively switching a bias mode for one or more pages of device memory based on determining an access pattern for one or more other pages (e.g., adjacent or consecutive pages). In some embodiments, a bias mode management method may take advantage of spatial locality between pages to implement a predictive (e.g., switch-ahead) bias mode switching technique. For example, a k-page ahead technique may change the bias modes for b+k pages to the same bias mode when page b is switched based on determining an access pattern for page b.

Figure 10:
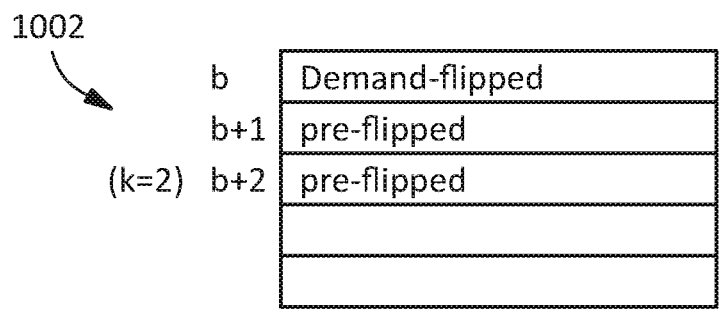
FIG. 10 illustrates an embodiment of a bias mode management method having predictive bias mode switching in accordance with example embodiments of the disclosure.

FIG. 10 illustrates an embodiment of a bias mode management method having predictive bias mode switching in accordance with example embodiments of the disclosure. In the embodiment illustrated in FIG. 10, a region 1002 of consecutive pages of device memory may have a first page at address b. If a device decides to flip the bias mode of page b based on determining an access pattern for page b (e.g., the bias mode is changed on demand based, for example, on a recent access of page b), the device may also pre-flip k additional consecutive pages, where k=2 in this example. Switching the additional pages may be based, for example, based on a prediction that, if page b was recently accessed by a device or host, the next k pages are likely to be accessed soon by the same device or host.

In some embodiments, the parameter k may be fixed, for example, be being hard-coded into a device driver and/or hard-wired into hardware, programmed into firmware, and/or the like. In some embodiments, k may be configurable, for example, by a programmer, a device manufacturer, and/or the like. In some embodiments, k may be determined adaptively, for example, through the application of heuristics and/or machine learning (ML).

For example, in some embodiments, k may be learned dynamically by applying an ML model such as Support Vector Machine (SVM), Nearest Neighbor (NN), and/or the like based on profiling of actual accesses of the pre-flipped pages. Examples of inputs to an ML model or heuristic technique may include any of a timestamp (e.g., number of clock cycles executed or time period taken up by an application), read and/or write access, page number, host and/or device access, page bias before access, any other parameters passed from an application and/or metadata information for accessed address provided by an application, and/or the like. Examples of outputs from an ML model may include a prediction of whether a future access may be by a host or a device, a number of consecutive pages (e.g., k) that may be accessed, and/or the like.

In some embodiments, different values of k or other parameters may be used for different phases of an application program execution. For example, a large value of k may be used for a phase of a program such as streaming that may tend to use sequential page accesses, but smaller values of k may be used for a phase of the program that may perform a table lookup which may involve smaller random accesses.

Some embodiments may implement stream-based workflow detection to decide when to change (e.g., flip) a page, for example, during coarse-grained control transfers between multiple compute initiators (e.g., processes) that may be working on pages of data in a device memory on the same device. In some embodiments, coarse-grained may refer to one or more pages that may only be used by only one process, wherein fine-grained may refer to one or more pages that may be shared by multiple processes. Thus, in some embodiments, one or more bias mode changes may be made for pages at a coarse grain level for stream based workflows. In some embodiments, the decision to change one or more pages may also be based on one or more parameters (which may also be referred to as hints) that may be passed from an application, for example, based on a programming model for the application. Examples of parameters may include those described above with respect to the embodiment illustrated in FIG. 10. In some embodiments, a stream-based workflow may be detected by detecting a relatively large number of sequential memory accesses. In some embodiments, when working with a stream-based workflow, a decision to select a bias mode may be based on accesses of multiple pages.

Some additional principles of this disclosure relate to a granularity of a counter used to determine an access pattern for one or more pages of device memory.

Figure 11:
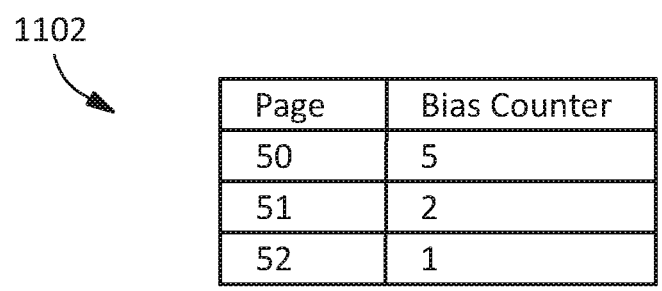
FIG. 11 illustrates an embodiment of a table for managing coherency bias counters for individual pages of device memory having a fixed granularity in accordance with example embodiments of the disclosure.

FIG. 11 illustrates an embodiment of a table for managing coherency bias counters for individual pages of device memory having a fixed granularity in accordance with example embodiments of the disclosure. The table 1102 illustrated in FIG. 11 may include an entry (e.g., a row) for each page of device memory. The left column of table 1102 may store the address of a page, and the right column may store the cumulative value of the bias counter. In the embodiment illustrated in FIG. 11, the counter may be implemented, for example, as at least a 3-bit counter because one of the counters has a value of five. The embodiment illustrated in FIG. 11 may be used to implement a fixed page granularity of any size, for example, 512 bytes, 4K bytes, 8K bytes, and/or the like.

Figure 12:
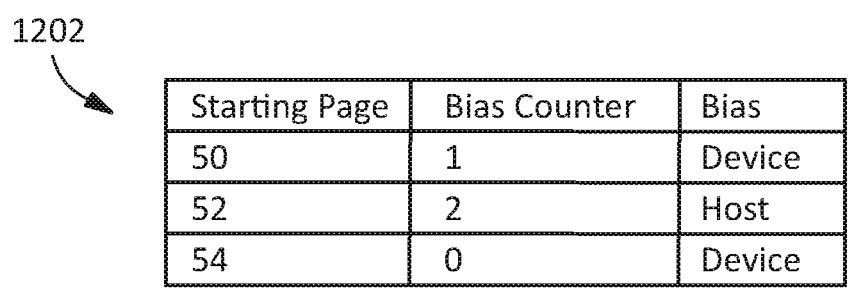
FIG. 12 illustrates an embodiment of a table for managing coherency bias counters for fixed size regions of pages of device memory having a fixed granularity in accordance with example embodiments of the disclosure.

FIG. 12 illustrates an embodiment of a table for managing coherency bias counters for fixed size regions of pages of device memory having a fixed granularity in accordance with example embodiments of the disclosure. The table 1202 illustrated in FIG. 12 may include an entry (e.g., a row) for each region of N pages, which in some embodiments, may all have the same granularity. The left column of table 1202 may store the starting address of a region of N pages, and the center column may store the cumulative value of the bias counter for the corresponding region. In the embodiment illustrated in FIG. 12 may also include an additional column on the right to indicate the current bias mode for the region of pages N pages. In the example embodiment illustrated in FIG. 12, each region may have a size N=2.

Depending on the implementation details, implementing a bias counter table based on regions of pages of device memory may reduce the amount of space used to store the counters, for example, because each counter may be used for multiple pages.

Figure 13:
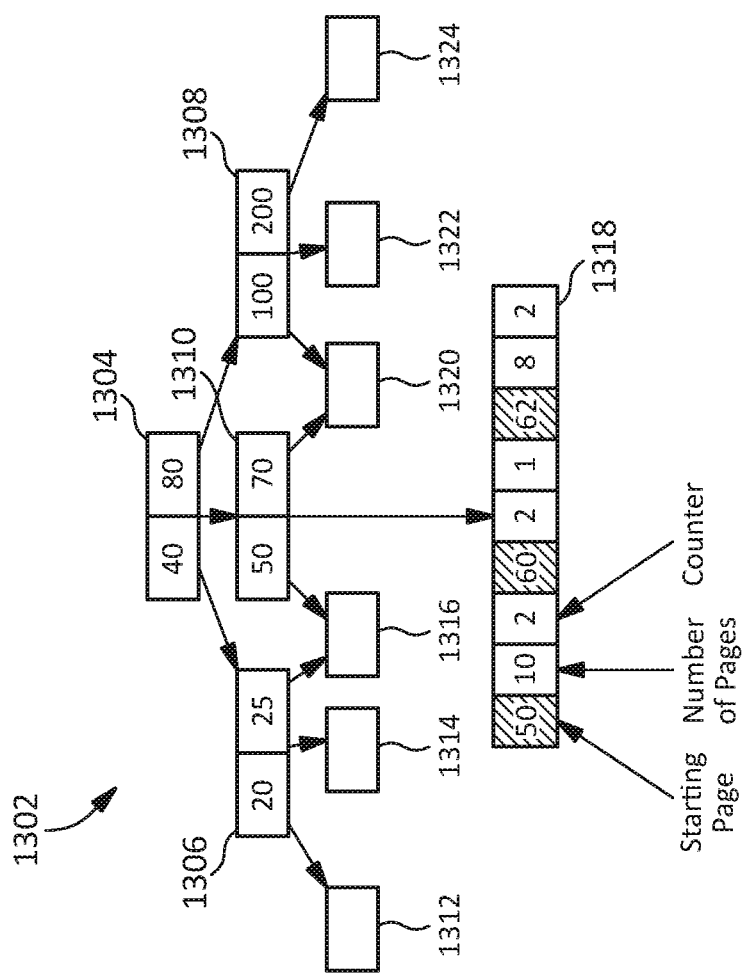
FIG. 13 illustrates an embodiment of a b-tree for managing coherency bias counters for pages of device memory in accordance with example embodiments of the disclosure.

FIG. 13 illustrates an embodiment of a b-tree for managing coherency bias counters for pages of device memory in accordance with example embodiments of the disclosure. The embodiment illustrated in FIG. 13 may be used to implement counters for regions of pages having variable granularity. The b-tree 1302 illustrated in FIG. 13 may include three levels, but other embodiments may include any number of levels. The top level may include a root node 1304 having two keys of 40 and 80 which may divide the memory page address space into three nodes at the next level down (the middle level). Thus, keys 40 and 80 in the root node 1304 may divide the memory page address space into a region having addresses lower than 40 in the leftmost node 1306 at the middle level, a region with addresses between 40 and 80 in the middle node 1308, and a region with addresses greater than 80 in the rightmost node 1310 in the middle level. The nodes at the next level down may include leaf nodes 1312, 1314, 1316, 1318, 1320, 1322, and 1324 having actual counter data.

Leaf node 1318 illustrates some example counter data for three different variable size regions of the address space. For example, the left three entries of leaf node 1318 may include a starting page address 50 for a first region, a number of pages 10 for the region, and a value of the bias counter 2 for the region. The next three entries may include a starting page address 60 for a second region, a number of pages 2 for the second region, and a value of the bias counter 1 for the second region. The three right entries may include a starting page address 62 for a third region, a number of pages 8 for the third region, and a value of the bias counter 2 for the third region.

Depending on the implementation details, the use of a b-tree or other tree structure may reduce the amount of space used to store counters for regions of pages of device memory.

Figure 14:
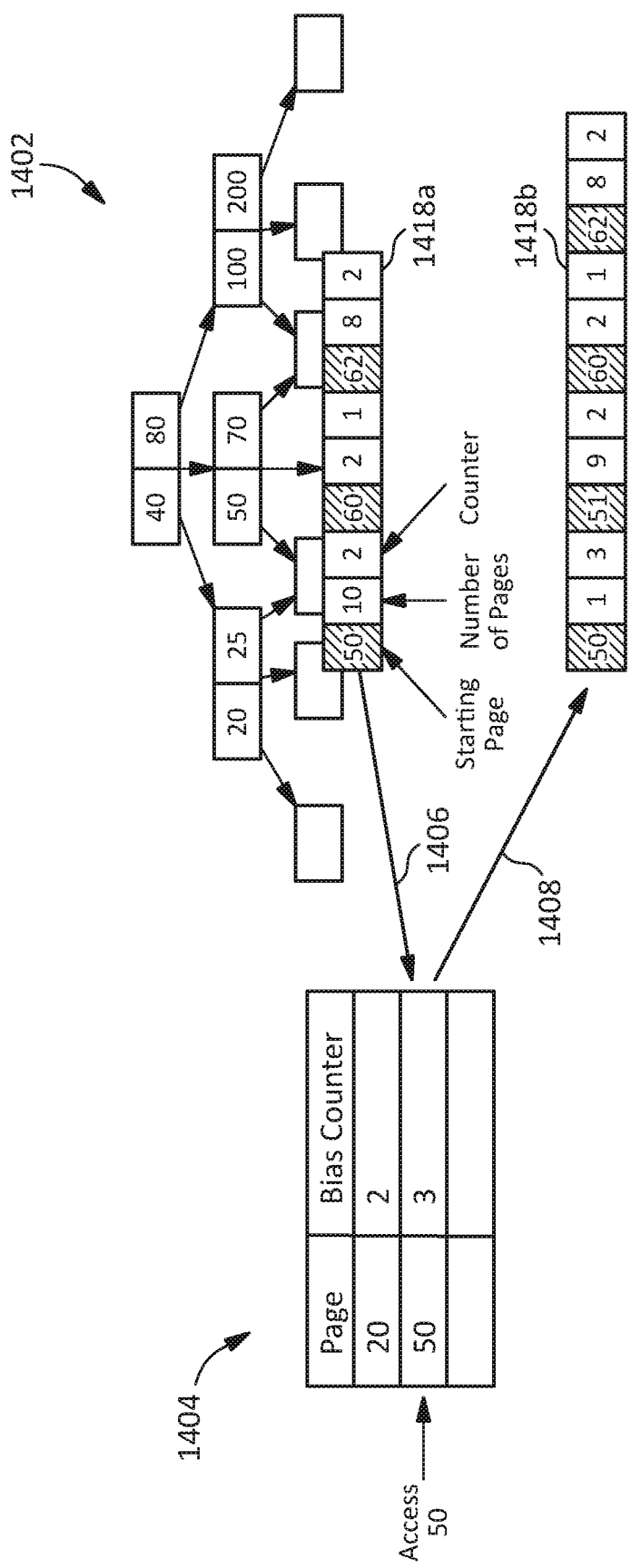
FIG. 14 illustrates an embodiment of a hybrid b-tree and table structure for managing coherency bias counters for pages of device memory in accordance with example embodiments of the disclosure.

FIG. 14 illustrates an embodiment of a hybrid b-tree and table structure for managing coherency bias counters for pages of device memory in accordance with example embodiments of the disclosure. The embodiment illustrated in FIG. 14 may include a b-tree 1402 which may initially have data similar to that in the embodiment illustrated in FIG. 13. However, the embodiment illustrated in FIG. 14 may also include a table 1404 which may be used to cache one or more entries (e.g., hot entries that may be accessed frequently). For example, as shown in FIG. 14, the three data values for the region starting at page 50 stored in the leftmost positions of node 1418a may be pulled from the b-tree and stored in the cache table 1404 as shown by arrow 1406. The values of the starting page address 50 for a first region, a number of pages 10 for the region, and a value of the bias counter 2 for the region may be updated in the table, for example, based on any of the bias mode management techniques disclosed herein. When the region beginning at page 50 is no longer hot (e.g., not being frequently accessed), the three data values for the region starting at page 50 may be pushed back to the b-tree 1402 to node 1418b as shown by arrow 1408.

Depending on the implementation details, a hybrid table and b-tree data structure as illustrated in FIG. 14 may improve performance, for example, by reducing the time involved in searching the b-tree for frequently accessed pages of device memory.

Figure 15:
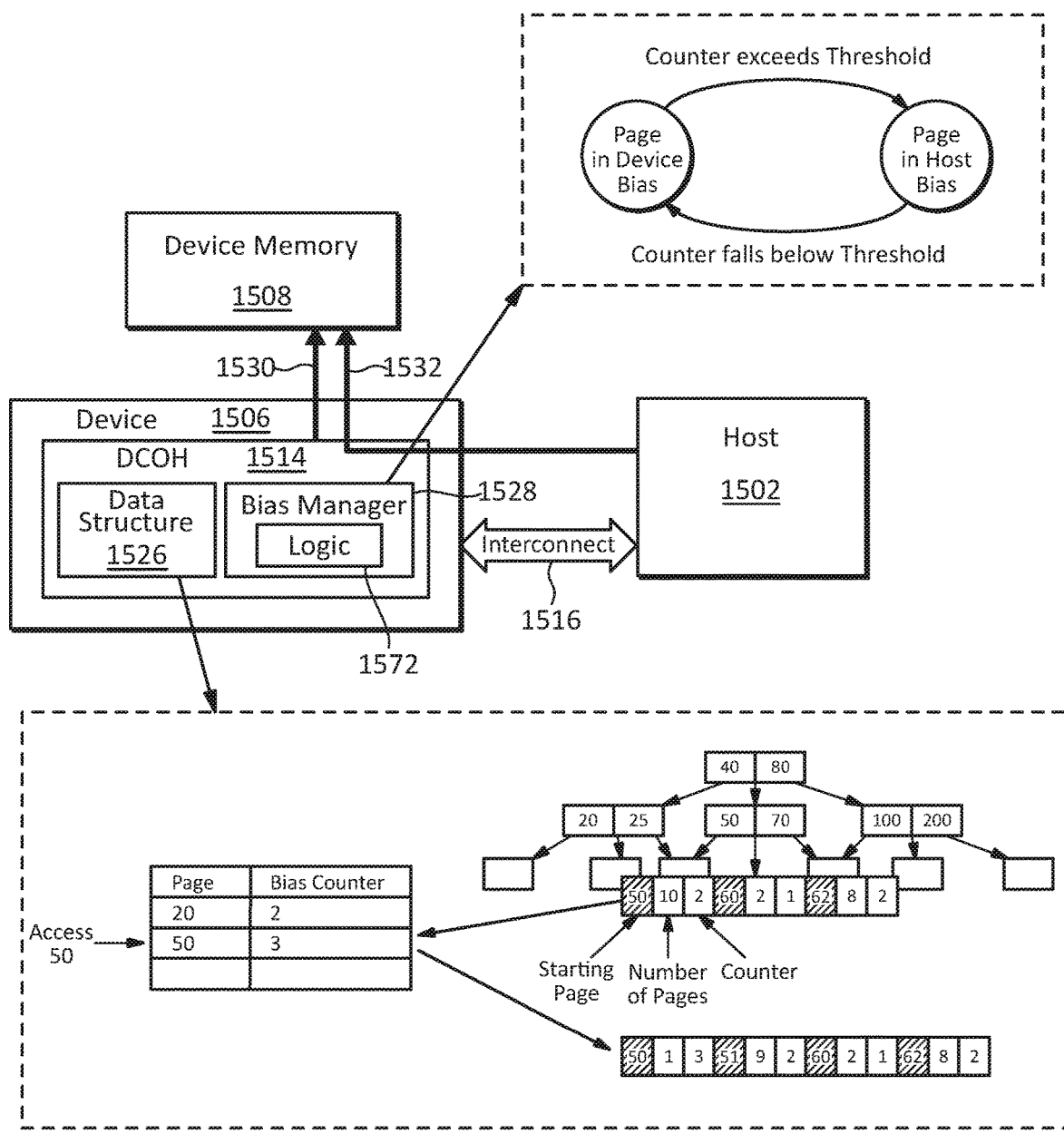
FIG. 15 illustrates an embodiment of a coherent memory system with bias mode management in accordance with example embodiments of the disclosure.

FIG. 15 illustrates an embodiment of a coherent memory system with bias mode management in accordance with example embodiments of the disclosure. The embodiment illustrated in FIG. 15 may be similar to that illustrated in FIG. 9A, however, FIG. 15 illustrates that, in some embodiments, the bias manager 1528 and logic 1572 may implement a 1-bit counting bias mode management technique in which bias mode of a page may be flipped based on whether the bias counter for the page exceeds a threshold as illustrated in FIG. 8. FIG. 15 also illustrates that the data structure 1526 may be implemented with a hybrid table and b-tree data structure similar to that illustrated in FIG. 14. Depending on the implementation details, the embodiment illustrated in FIG. 15 may enable a bias table to be managed in a resource efficient manner, e.g., using smaller per-page table tier and/or a condensed variable-length B-tree tier.

In embodiments in which a device such as devices 606 and 906 may be implemented as a storage device (e.g., a computational storage device having hardware resources for performing one or more operations or other tasks assigned by a host), the storage device may be based on any type of storage media including magnetic media, solid state media, optical media, and/or the like. For example, in some embodiments, a device may be implemented as an SSD based on NAND flash memory, persistent memory such as cross-gridded nonvolatile memory, memory with bulk resistance change, phase change memory (PCM) and/or the like, and/or any combination thereof. Such a storage device may be implemented in any form factor such as 3.5 inch, 2.5 inch, 1.8 inch, M.2, Enterprise and Data Center SSD Form Factor (EDSFF), NF1,and/or the like, using any connector configuration such as Serial ATA (SATA), Small Computer System Interface (SCSI), Serial Attached SCSI (SAS), U.2, and/or the like. Such a storage device may be implemented entirely or partially with, and/or used in connection with, a server chassis, server rack, dataroom, datacenter, edge datacenter, mobile edge datacenter, and/or any combinations thereof, and/or the like.

Any of the functionality described herein, including any of the host functionality, device functionally, and/or the like described above may be implemented with hardware, software, or any combination thereof including combinational logic, sequential logic, one or more timers, counters, registers, state machines, volatile nonvolatile memories, persistent memories, and/or any combination thereof, CPLDs, FPGAs, ASICs, CPUs, GPUs, NPUs, TPUs, and/or the like, executing instructions stored in any type of memory. In some embodiments, one or more components may be implemented as an SOC.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc., may be implemented with multiple processes, operations, etc., or in which multiple processes, operations, etc. may be integrated into a single process, operation, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
monitoring one or more accesses of a page of memory;
determining, based on the monitoring, an access pattern of the page of memory; and
selecting, based on an indication, a coherency bias for the page of memory;
wherein the one or more accesses comprises a first access by a first apparatus and a second access by a second apparatus; and
wherein the determining comprises modifying, based on the first access and the second access, the indication.

2. The method of claim 1, further comprising using the coherency bias for the page of memory.

3. The method of claim 1, wherein the determining comprises comparing the indication to a threshold.

4. The method of claim 1, wherein the modifying, based on the first access and the second access, comprises-modifying, based on the first access, the indication in a first manner.

5. The method of claim 4, wherein the modifying, based on the first access and the second access, comprises modifying, based on the second access the indication in a second manner.

6. The method of claim 5, wherein the first manner counteracts the second manner.

7. The method of claim 1, wherein the coherency bias is a first coherency bias, and the determining is further based on a second coherency bias of the page of memory.

8. The method of claim 1, wherein:
the page of memory is accessed by a process;
the access pattern comprises a stream; and
the selecting is further based on a control transfer for the process.

9. A method comprising:
monitoring one or more accesses of a page of memory;
determining, based on the monitoring, an access pattern of the page of memory; and
selecting, based on the access pattern, a coherency bias for the page of memory;
wherein the page of memory is a first page of memory, and the method further comprises:
using the coherency bias for a number of second pages of memory; and
determining the number of second pages of memory based on a profile of the one or more accesses.

10. The method of claim 9, wherein the number of second pages of memory is determined by a machine learning model trained on the one or more accesses.

11. The method of claim 1, wherein the page of memory is a first page of memory and the one or more accesses is one or more first accesses, the method further comprising:
monitoring one or more second accesses of a second page of memory; and
maintaining the indication based on the one or more second accesses.

12. The method of claim 1, wherein the page of memory is a first page of memory, the one or more accesses is one or more first accesses, and the indication is a first indication, the method further comprising:
monitoring one or more second accesses of at least one second page of memory;

wherein monitoring the one or more second accesses of the at least one second page of memory comprises maintaining a second indication of the one or more second accesses.

13. The method of claim 12, further comprising storing the first indication and the second indication in a tree structure.

14. The method of claim 1, wherein:
the monitoring, the determining, and the selecting are performed by a device;
the page of memory is a first page of device memory of the device; and
at least one of the one or more accesses of the page of memory is by a host comprising a second page of memory that is coherent with the first page of memory.

15. A device comprising:
a memory controller;
an interconnect interface;
a device coherency agent configured to maintain coherency between a first memory coupled to the memory controller and a second memory accessible to the device using the interconnect interface; and
bias management logic configured to:
monitor a first access, by a first apparatus, of a page of the first memory;
monitor a second access, by a second apparatus, of the page of the first memory;
modify, based on the first access and the second access, an indication;
determine, based on the indication, an access pattern of the page of the first memory; and
select a coherency bias for the page of the first memory based on the access pattern.

16. A system comprising:
a host;
a host memory coupled to the host;
a device coupled to the host using an interconnect; and
a device memory coupled to the device;
wherein the host is configured to maintain coherency between the host memory and the device memory; and
wherein the device is configured to select a coherency bias for a page of the device memory based on an access pattern of the page of the device memory:,
wherein the system further comprises bias management logic configured to:
monitor a first access, by a first apparatus, of a page of the device memory;
monitor a second access, by a second apparatus, of the page of the device memory;
modify, based on the first access and the second access, an indication;
determine, based on the indication, an access pattern of the page of the device memory; and
select, based on the access pattern, a coherency bias for the page of the device memory.

17. The system of claim 16, wherein the bias management logic is configured to:
modify, based on the first access, the indication in a first manner; and
modify, based on the second access, the indication in a second manner.

18. The device of claim 15, wherein the bias management logic is configured to:
modify, based on the first access, the indication in a first manner; and
modify, based on the second access, the indication in a second manner.

19. The method of claim 13, wherein the tree comprises information about a granularity of the at least one second page of memory.

20. The method of claim 19, further comprising storing, in a data structure, information about a region comprising the first page of memory, wherein the data structure is configured to store information from the tree.

* * * * *